United States Patent Office 3,183,742
Patented May 18, 1965

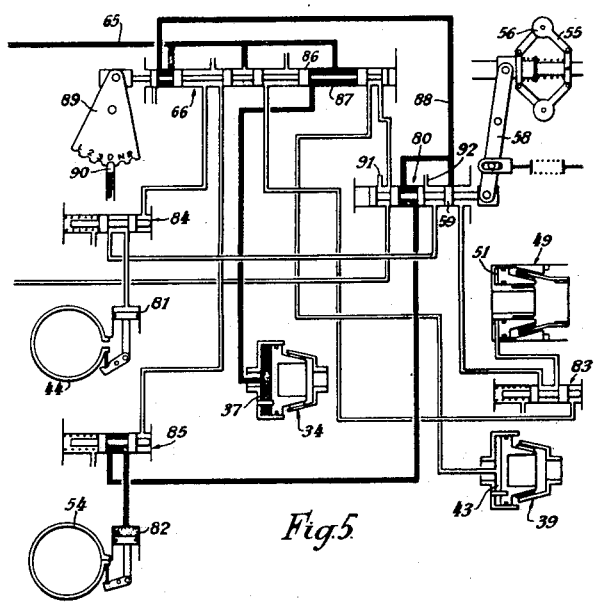

3,183,742
POWER TRANSMISSION SYSTEMS PROVIDING AUTOMATIC CHANGES OF GEAR RATIO
Frederick Edward Ellis and Peter J. Standbridge, Leamington Spa, England, assignors to Automotive Products Company Limited, Leamington Spa, England
Filed Apr. 13, 1962, Ser. No. 187,374
Claims priority, application Great Britain, Apr. 14, 1961, 13,556/61; June 27, 1961, 23,288/61
1 Claim. (Cl. 74—757)

This invention relates to power transmission systems providing automatic changes of gear ratio, and has for its object to provide a power transmission system, especially for motor vehicles, which is compact, and efficient in operation.

According to the present invention, an automatic change-speed gearbox comprises an input shaft, an output shaft and constantly meshed speed reduction gearing through which rotation is transmitted from the input to the output shaft, said gearing including an intermediate gear assembly mounted on a rotatable carrier and a gear wheel meshing therewith which is capable of being held to act as a reaction member, two clutches each engageable to couple a different member of the gearing to the input or the output shaft to produce rotation of the output shaft in opposite directions for a fixed direction of rotation of the input shaft, and frictional holding means acting on the carrier and on the said gear wheel, manually operable means to selectively engage said clutches and engage the frictional holding means on the carrier simultaneously with each of them, and speed responsive automatic means operable when one of the clutches is engaged and acting successively with increase of speed first to disengage the frictional holding means on the carrier and at substantially the same time to engage the frictional holding means on the said gear wheel and subsequently to disengage the frictional holding means on said gear wheel and substantially at the same time engage the other clutch.

The constantly meshed gearing preferably comprises a single input gear wheel and two output gear wheels arranged to be driven in opposite directions by the intermediate gear assembly, the two clutches acting each to couple one of said output gear wheels to the output shaft.

The invention is hereinafter described with reference to the accompanying drawings, in which.

Figure 3:
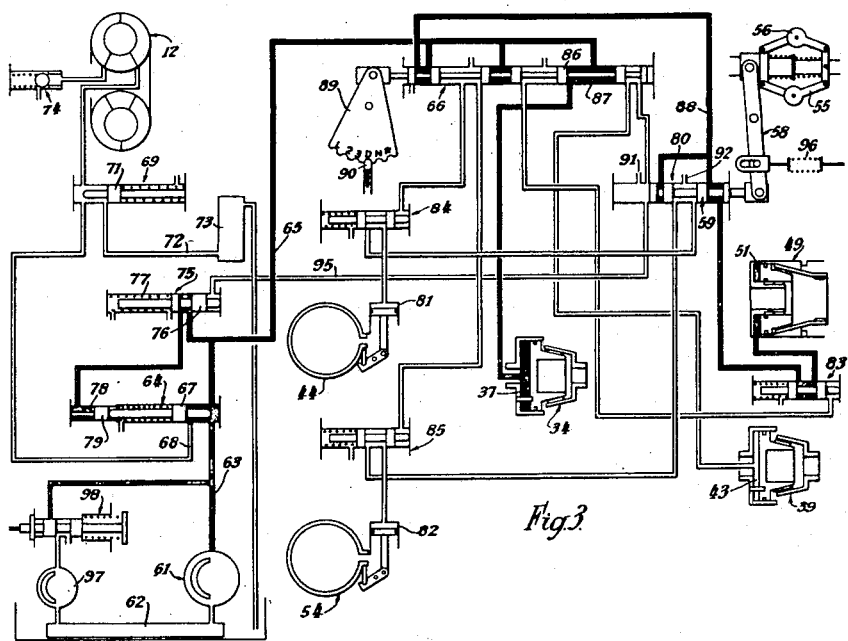
Figure 7:
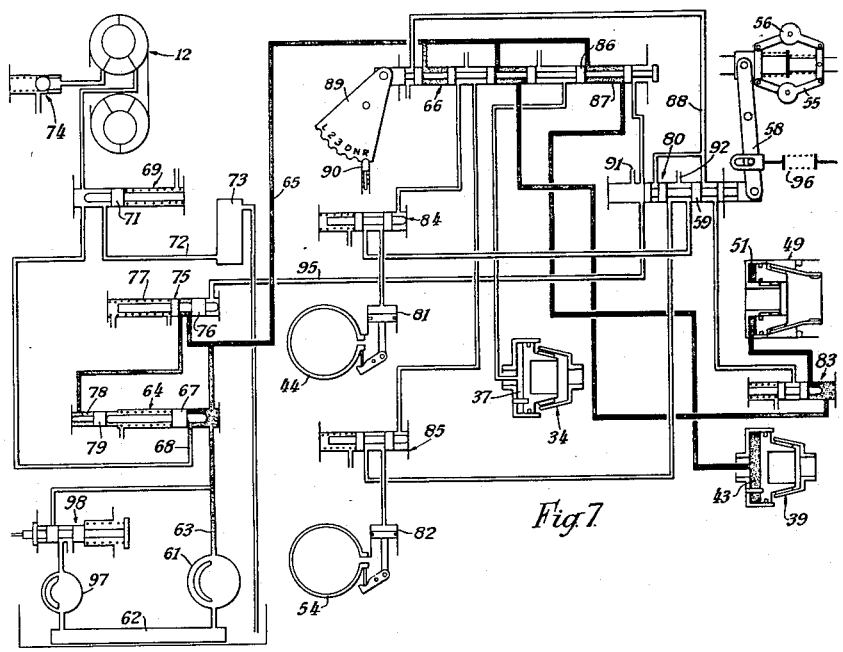

FIGURES 3 to 10 are diagrams showing the liquid pressure control circuit of the gearbox, each showing the settings of the various valves for a different drive condition and indicating which of the clutches and frictional holding means are engaged to provide that drive condition. FIGURES 3, 6 and 7 show the whole system, but the pressure supply section and torque converter are omitted from the other figures.

Figure 4:
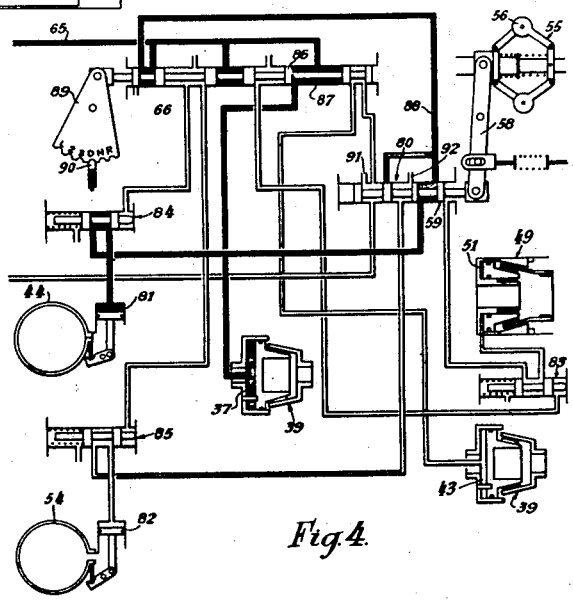
Figure 8:
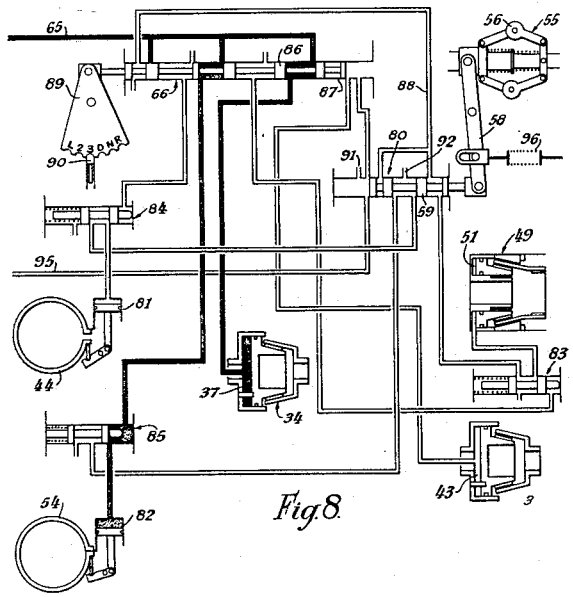
Figure 9:
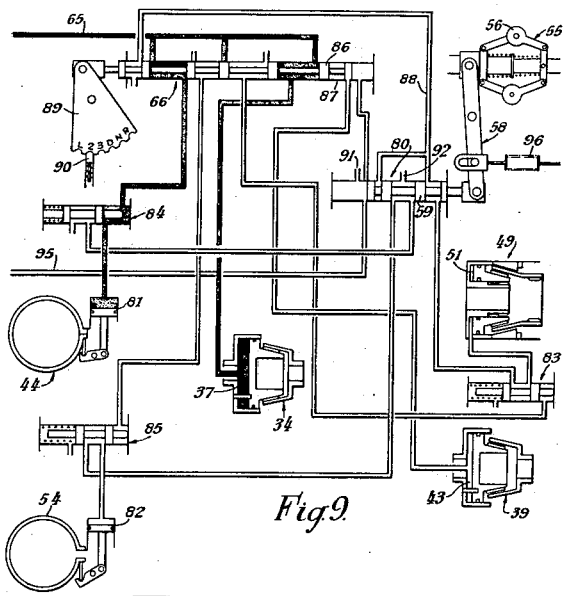

FIGURE 3 shows the system set for automatic forward drive and with low gear engaged;

FIGURE 4 shows the system set as in FIGURE 3 but with second gear engaged;

FIGURE 5 shows the system set as in FIGURE 3 but with third gear engaged;

FIGURE 6 shows the system set as in FIGURE 3 but with direct drive engaged;

FIGURE 7 shows the system set for reverse drive;

FIGURE 8 shows the system set for forward drive in third gear;

FIGURE 9 shows the system set for forward drive in second gear; and

Figure 10:
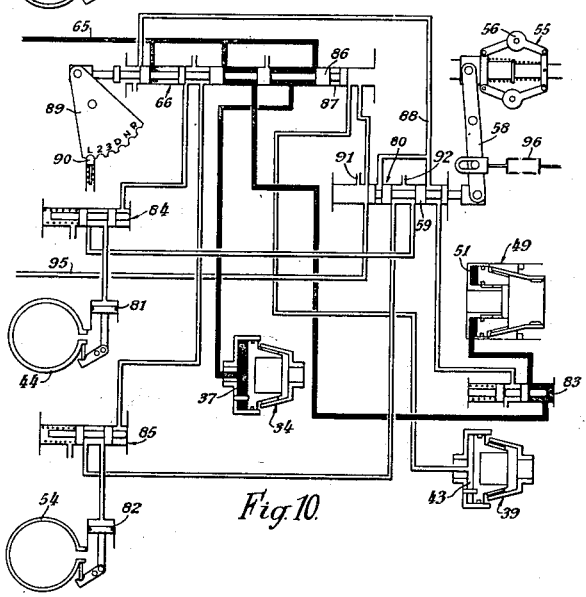

FIGURE 10 shows the system set for forward drive in low gear.

Figure 1:
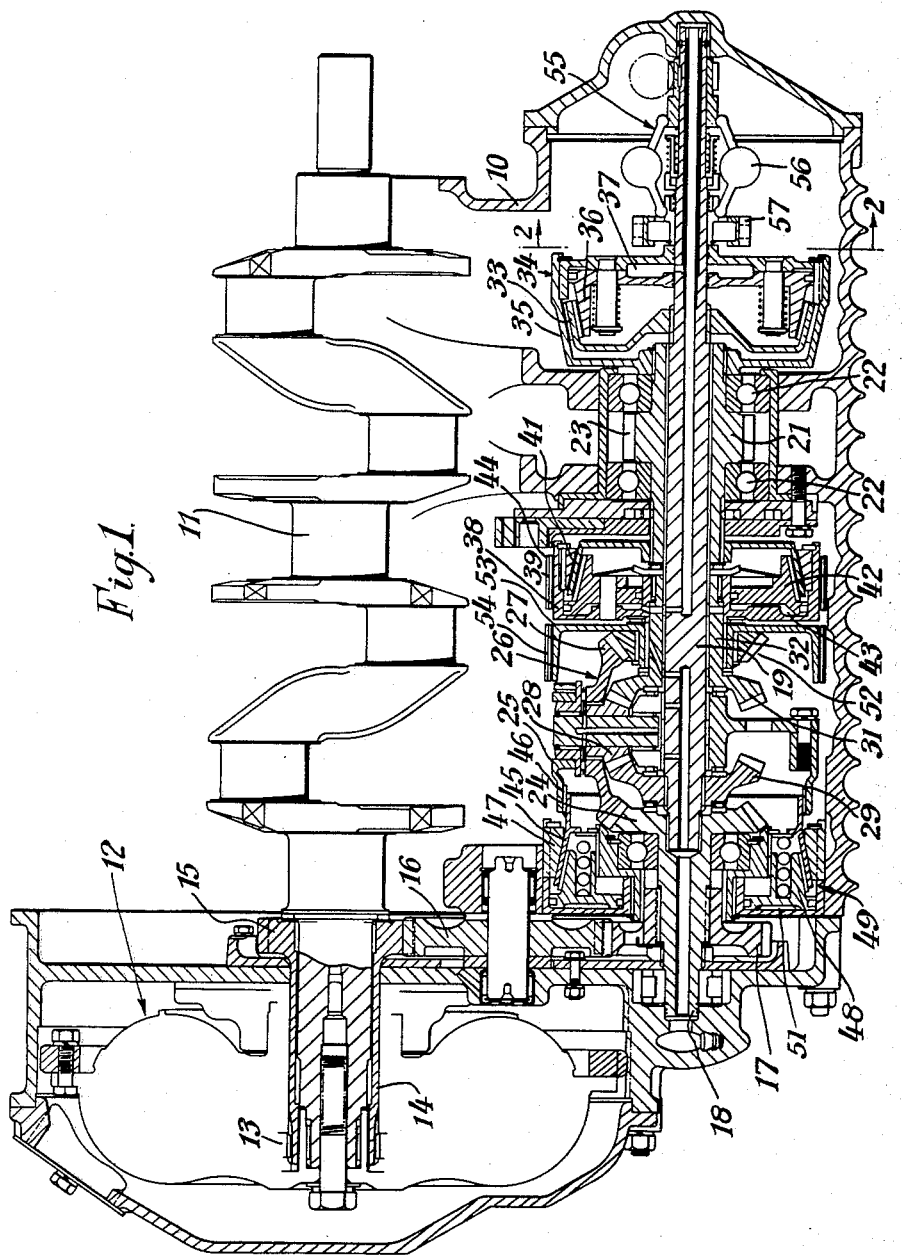
FIGURE 1 is a longitudinal sectional elevation of one form of automatic change-speed gearbox according to the invention, the gearbox providing four forward speeds and reverse drive and being settable for automatic changes between the forward speeds or for manual selection of any one of the forward speeds other than direct drive.
Figure 2:
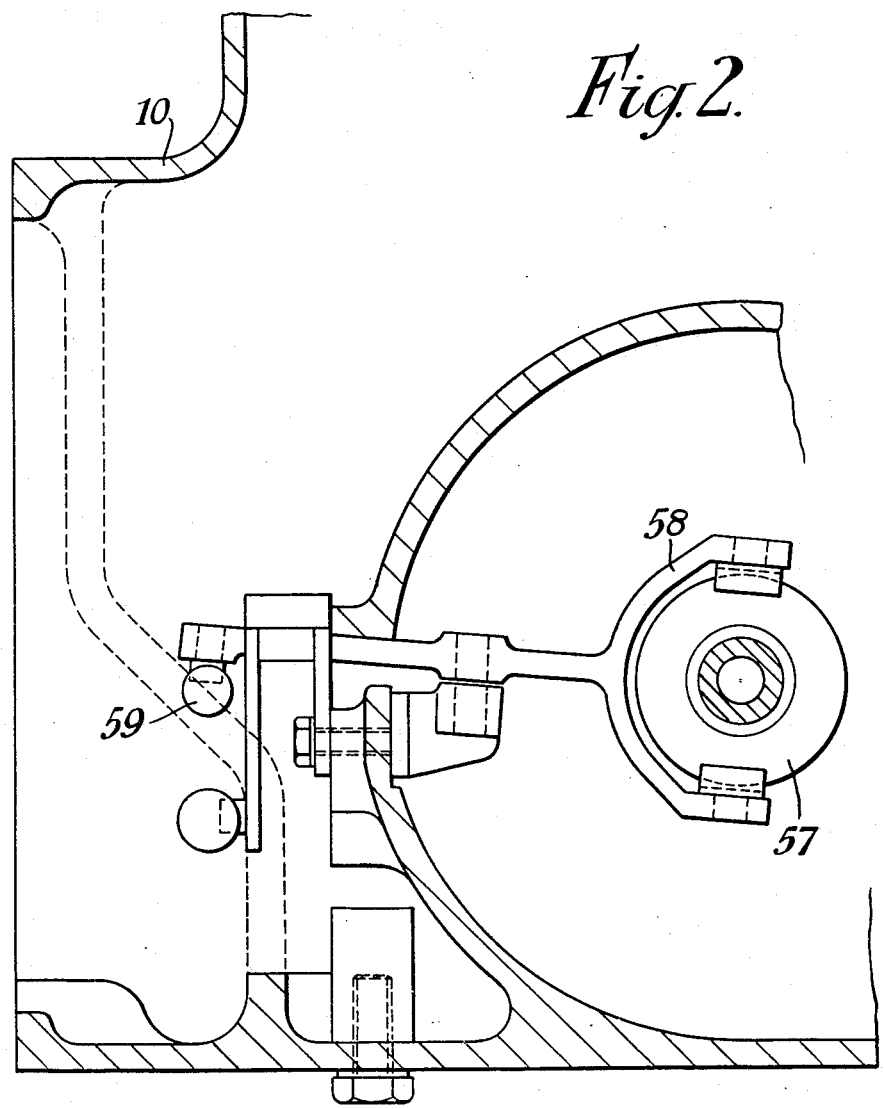
FIGURE 2 is a partial cross-section on the line 2—2 of FIGURE 1.

Referring to FIGURE 1 of the drawings, a speed-reducing gear train is housed in the crankcase 10 of an internal combustion engine, the crankshaft 11 of the engine having mounted co-axially therewith a fluid torque converter 12. The impeller of the torque converter 12 is fixed to the engine crankshaft and the turbine 13 of the said torque converter is mounted on a sleeve 14 rotatable around the said crankshaft. The sleeve 14 is connected by a spur gear train 15, 16, 17 to an input shaft 18 of the gear train. An intermediate shaft 19, spigoted at one end into the input shaft 18 and co-axial therewith, has rotatably mounted around it a tubular output shaft 21 which is mounted in bearings 22 in the crankcase and carries a spur gear 23 from which the final drive to the vehicle wheels is taken.

A driving bevel or first sun gear 24 is mounted on the input shaft 18. A carrier 25 rotatably mounted on the intermediate shaft 19 carries two or more intermediate gear assemblies, one of which is shown at 26, each intermediate gear assembly comprising a larger bevel gear 27 and a smaller bevel gear 28 secured together so as to rotate as one about an axis radial to that of the shaft 19, the larger bevel gear 27 meshing with the driving bevel or third sun gear 24. A first driven bevel gear 29 meshing with the smaller bevel gears 28 of the intermediate gear assemblies is fixed on the intermediate shaft 19, and a second driven bevel or fourth sun gear 31, mounted on a reverse drive sleeve 32 rotatable on the intermediate shaft 19, also meshes with the said smaller bevel gears 28, the driven bevel gears 29 and 31 being on opposite sides of the axes of the intermediate gear assemblies so that they are rotated in opposite directions by rotation of the said assemblies.

The intermediate shaft 19 has slidably but non-rotatably mounted on it a cone member 33 constituting the driving member of a cone clutch 34 the driven member 35 of which is fixed to one end of the driven shaft 21, the driven member 35 having slidably mounted on it a clamping member 36 movable by liquid pressure acting in a chamber 37 to engage the clutch.

The reverse drive sleeve 32 has fixed to it a drum 38 constituting the driving member of a second cone clutch 39 the driven member 41 of which is constituted by a cone member slidable on splines on the output shaft 21, a clamping member 42, slidably mounted in the drum 38 being movable by liquid pressure acting in a chamber 43 to engage the clutch.

A brake band 44 adapted to engage the external surface of the drum 38 provides a frictional holding means for holding the said drum and the second output bevel gear 31 against rotation.

The carrier 25 has mounted on it a cone member 45, slidably but non-rotatably coupled to it by splines at 46, the said cone member 45 being engageable between a coned ring 47 fixed in the crankcase 10 and a coned surface on a clamping member 48 to provide a cone brake 49 holding the carrier 25 against rotation. The clamping member 48 is acted on to engage the cone clutch 49 by liquid pressure acting in a chamber 51.

A further bevel or second sun gear 52, mounted on a drum 53 rotatably mounted on the reverse drive sleeve 32, meshes with the larger bevel gears 27 of the intermediate gear assemblies 26 on the opposite side of the axes of the said assemblies to the driving bevel gear 24, and a brake band 54 is provided to hold the drum 53 against rotation.

A centrifugal governor 55 mounted on the intermediate shaft 19 includes weights 56 arranged to fly out under the action of centrifugal force and move a ring 57 axially of the said shaft, the ring being coupled by a lever 58 to the plunger 59 of a slide valve which, as will be hereinafter described, controls the supply of liquid under pressure to operate the cone clutches and friction holding means.

The liquid pressure control system will now be described with reference to FIGURES 3 to 10 of the drawings.

Referring to FIGURE 3, the torque converter 12, cone clutches 34 and 39, cone brake 49 and brake bands 44 and 54 are shown diagrammatically, as are also the centrifugal governor 55, lever 58 and valve plunger 59.

Liquid is placed under pressure to feed the torque converter 12 and to actuate the clutches and brake bands by a pump 61 driven in any suitable manner by the engine of the vehicle in which the transmission is mounted, the pump drawing liquid from a reservoir 62 and delivering it through a conduit 63 to a regulating valve 64. From the regulating valve 64 liquid can pass through a permanently open connection to a conduit 65 leading to a manually operable selector valve 66, the pressure of the liquid also acting on a spring-loaded plunger 67 in the regulating valve to move the said plunger and, when a predetermined pressure is attained, to cause the said plunger to expose a port leading to a conduit 68 leading to the torque converter 12. A valve 69 interposed in the conduit 68 has a spring-loaded plunger 71 which is displaced by the liquid pressure, when a predetermined pressure is reached, to open a return conduit 72 leading, through a liquid cooler 73, back to the reservoir 62. Liquid from the torque converter 12 passes through a non-return valve 74 to a lubricating system for the transmission, the liquid used being a lubricating oil. A branch conduit leading from the conduit 65 opens into a modulating valve 75 including a plunger 76 normally urged by a spring 77 to a position such that the said branch conduit is connected to a chamber 78 in the regulating valve 64, in which it acts on a second plunger 79. The plunger 79 abuts against the plunger 67, and is of less diameter than the portion of the plunger 67 acted on by the pressure from the pump 61, and pressure acting on the plunger 79 assists the loading spring of the said valve 64 and thereby causes a higher operating pressure to be built up in the control system.

The selector valve 66 controls the supply of liquid under pressure to the slide valve 80 of which the plunger 59 controlled by the centrifugal governor 55 forms a part.

The pressure chamber 51 of the cone brake 49, and motor cylinders 81 and 82 for engaging the brake bands 44 and 54 respectively receive liquid under pressure through change-over valves 83, 84 and 85 respectively, the change-over valves each having one position in which they direct to the pressure chamber 51 and motor cylinders 81 and 82 liquid supplied through the slide valve 80, and another position in which they direct to the said pressure chamber and motor cylinders liquid supplied directly through the selector valve 66.

The selector valve 66 includes a plunger 86 manually movable in a bore 87 to connect three branches of the conduit 65 to various outlets as will hereinafter appear, and the slide valve plunger 59 controls the connections of two inlet branches of a conduit 88 leading from the selector valve 66 to various outlets as will also hereinafter appear.

The selector valve 66 is operated by any convenient mechanical linkage and is coupled to a quadrant 89 cooperating with a spring-loaded detent 90 to locate it in any one of a number of positions.

The following description sets out the positions of the various valves and the liquid connections provided thereby to produce the various operating conditions of the transmission.

In FIGURE 3, the transmission is set for automatic gear changing, and it is assumed that the vehicle is moving at a low speed such that the governor weights 56 have not moved from their inward positions.

The selector valve 66 is in such a position that the conduits 65 and 88 are connected one to the other, and the slide valve 80 is in such a position that the pressure chamber 51 of the brake 49 is connected to pressure through the change-over valve 83 and slide valve 80. The selector valve also connects the pressure chamber 37 of the clutch 34 to pressure, and connects the pressure chamber 43 of the clutch 39 to the reservoir through a drain outlet 91 in the slide valve 66, the motor cylinders 81 and 82 being also connected to the reservoir through a drain outlet 92 in the slide valve 80. Thus the brake 49 and clutch 34 are engaged, the former holding the carrier 25 against rotation so that the input bevel gear 24 rotates the intermediate gear assemblies 26 about their axes and drives the driven bevel gears 29 and 31 in opposite directions. The clutch 34 transmits the rotation of the driven bevel gear 29 and intermediate shaft 19 to the output shaft 21, the driven bevel gear 31 rotating idly. The gear train thus provides a speed reduction which may be 2:1, depending on the relative sizes of the bevel gears 24, 27, 28 and 29. The portions of the liquid pressure system in which pressure is acting are shown stippled in FIGURE 3. As the speed of the vehicle increases, the governor weights move outwardly until they reach the position shown in FIGURE 4, moving the plunger 59 of the slide valve 80 until the conduit leading to the pressure chamber 51 of the clutch 49 is isolated from the conduit 88 and connected to drain, so that the brake 49 is released, and the conduit leading from the slide valve 80 to the change-over valve 84 is connected to the conduit 88, so that the brake band 44 is engaged to hold the drum 38 and driven bevel gear 31 against rotation. The carrier 25 is thus released for rotation, and the intermediate gear assemblies roll around the driven bevel gear 31, causing the driven bevel gear 29 and intermediate shaft 19 to be driven with a lesser gear reduction. The portions of the liquid pressure system in which liquid pressure acts to provide this condition are shown stippled in FIGURE 4.

A further increase of vehicle speed causes further outward movement of the governor weights, and the plunger 59 of the slide valve 80 is moved to the position shown in FIGURE 5, connecting the motor cylinder 81 to drain at 92 and connecting the motor cylinder 82 to pressure. The driven bevel gear 31 is thus released for rotation, but the bevel gear 52 is held by the brake band 54, and the intermediate gear assemblies 26 run around the said bevel gear 52, the difference in relative diameter between the bevel gears 28, 31 and the bevel gears 27, 52 causing the speed reduction of the gear train to be further reduced. The portions of the liquid pressure system which are under pressure for this condition are shown stippled in FIGURE 5.

A still further increase of vehicle speed causes the centrifugal governor to move the plunger 59 of the slide valve 80 to move to the position shown in FIGURE 6, in which the pressure chamber 43 of the clutch 39 is connected to pressure through the said slide valve, and the motor cylinder 82, as well as the motor cylinder 81 is connected to the reservoir. Both clutches 34 and 39 are therefore engaged, and the gear train is locked up so that it rotates bodily and transmits the rotation of the input shaft 18 without speed reduction. The connection between the slide valve 80 and the pressure chamber 43 of the clutch 39 is provided by conduits 93, 94 and a part of the selector valve bore 87, so that the connection can be made only when the said selector valve is set to the postion shown in FIGURES 3 to 6.

With the slide valve 80 in the position for direct drive, pressure is transmitted from the slide valve 80 through a conduit 95 to the modulating valve 75 to displace the plunger 76 thereof to isolate the chamber 78 in the regulating valve 64 from the pump 61 and connect it to drain, thereby reducing the load on the plunger 67 and also reducing the pressure at which the liquid acts in the control system.

It will be evident that as the speed of the vehicle decreases, changes of gear ratio will take place in the opposite direction. The response of the centrifugal governor 55 to changes of vehicle speed is modified in accordance with variations of the engine throttle valve position so that for large throttle openings both the upward and the downward gear changes take place at a higher speed, a spring 96 being provided which opposes the outward movement of the governor weights and which is loaded progressively as the engine throttle valve is opened.

Reverse drive is selected by moving the selector valve 66 from the position shown in FIGURE 3 to that shown in FIGURE 7, as a result of which the brake 49 is engaged by liquid pressure reaching the pressure chamber 51 through connections in the selector valve 66 and change-over valve 83, the said liquid operating the change-over valve 83 to isolate the pressure chamber 51 from the slide valve 80. Liquid under pressure is also fed through the selector valve 66 to the pressure chamber 43 of the clutch 39. Consequently the carrier 25 is held against rotation, and the driven shaft 21 is clutched to the reverse drive sleeve 32, with the result that the driven shaft is rotated in the reverse direction, the outward bevel gear 29 and intermediate shaft 19 rotating idly.

To select third gear manually, the quadrant 89 is moved to the position shown in FIGURE 8, moving the selector valve plunger 86, as shown in that figure, to a position such that liquid under pressure is supplied only to the pressure chamber 37 of the clutch 34 and to the change-over valve 85, the pressure acting in the latter to isolate the motor cylinder 82 from the slide valve 80 and enable it to receive liquid under pressure direct from the selector valve 66. Thus third gear is held engaged regardless of the speed of the vehicle.

Similarly, second gear may be selected manually by setting the quadrant 89 and selector valve 66 to the position shown in FIGURE 9, the change-over valve 84 then being operated to isolate the motor cylinder 81 from the slide valve 80 and connect it directly to the selector valve, whilst pressure is also supplied to the pressure chamber 37 of the clutch 34. Thus second gear is held engaged regardless of the speed of the vehicle.

Manual selection of low gear is effected by setting the quadrant 89 and selector valve 66 to the positions shown in FIGURE 10, in which liquid is fed to the pressure chamber 37 of the clutch 34 and through the change-over valve 83 from the selector valve 66 to the pressure chamber 51 of the clutch 49, the change-over valve 83 being operated to isolate the said pressure chamber 51 from the slide valve 80 so that the low gear setting is not changed as the speed of the vehicle rises.

Since the engagement of gears in the gearbox depends on the delivery of liquid by the pump 61 driven by the vehicle engine, the transmission system as so far described cannot transmit torque from the road wheels of the vehicle to the engine for tow starting. To enable tow starting to be performed, a second pump 97 is provided which is driven from the output side of the transmission system and normally circulates liquid idly through a valve 98 back to the reservoir 62. The valve 98 is operable manually to cause the pump 97 to deliver liquid into the conduit 63 so as to cause engagement of a selected gear and enable the torque converter 12 to transmit torque. The invention thus provides a transmission system including a variable speed gearbox which provides automatic changes between four forward ratios, manual selection of reverse drive, and also manual selection of all forward ratios except direct drive.

If only three speed ratios are required, the bevel gear 52 and the brake band controlling its rotation may be omitted, the selector valve and slide valve being modified accordingly.

The invention is not limited to the particular arrangement of gearing described herein. For example, instead of providing two oppositely rotating output bevel gears capable of being selectively connected to the output shaft, the input shaft may be selectively connectible to two driving bevel gears arranged to rotate the intermediate gear assemblies in opposite directions, the drive to the output shaft taking place through a single output bevel gear.

We claim:

A transmission comprising an input shaft, an output shaft and means connecting the input shaft to the output shaft for driving the output shaft at four different speeds in the same direction as the input shaft and at one speed in the opposite direction to the input shaft, said means comprising a carrier, at least one intermediate planet gear assembly mounted on said carrier and comprising larger and smaller bevel gears rotating together as one, a driving bevel gear and a reaction bevel gear both meshing with one of said planet gears, a first and a second driven bevel gear both meshing with the other of said planet gears, said driving bevel gear rotating with said input shaft, means selectively holding the carrier against rotation and releasing the carrier for rotation, means for selectively clutching the first and second driven bevel gears to the output shaft and means for selectively holding the second driven bevel gear and the reaction bevel gear against rotation.

References Cited by the Examiner

UNITED STATES PATENTS

| | | | |
|---|---|---|---|
| 1,723,231 | 8/29 | Ellsworth | 74—675 |
| 2,361,104 | 10/44 | Jandasek | 74—757 |
| 2,597,245 | 5/52 | Kelbel. | |
| 2,845,819 | 8/58 | Laburte. | |
| 2,862,403 | 12/58 | Miller | 74—763 |
| 2,895,344 | 7/59 | Holdeman et al. | |
| 2,926,543 | 3/60 | Holdeman et al. | |
| 2,982,155 | 5/61 | Ellis | 74—757 |

DON A. WAITE, *Primary Examiner.*